(12) United States Patent
Higashi et al.

(10) Patent No.: US 6,381,526 B1
(45) Date of Patent: Apr. 30, 2002

(54) TORQUE DETECTION APPARATUS

(75) Inventors: Kenichi Higashi; Takahiro Suzuki; Yoshiyuki Ideno, all of Shizuoka (JP)

(73) Assignee: Suzuki Motor Corporation, Shizuoka (JP)

(*) Notice: Subject to any disclaimer, the term of this patent is extended or adjusted under 35 U.S.C. 154(b) by 0 days.

(21) Appl. No.: 09/635,700

(22) Filed: Aug. 10, 2000

(30) Foreign Application Priority Data

Aug. 30, 1999 (JP) .................................. 11-242960

(51) Int. Cl.[7] .................................................. B62D 5/00
(52) U.S. Cl. ............................ 701/41; 701/43; 180/443
(58) Field of Search .............................. 701/41, 42, 43; 180/412, 413, 415, 422, 443, 446

(56) References Cited

U.S. PATENT DOCUMENTS

| | | | | |
|---|---|---|---|---|
| 4,614,248 A | * | 9/1986 | Kakinami et al. | 180/446 |
| 5,414,627 A | * | 5/1995 | Wada et al. | 701/41 |
| 5,569,991 A | * | 10/1996 | Matsuoka et al. | 180/446 |
| 5,699,249 A | | 12/1997 | Noro et al. | 180/446 |
| 5,844,387 A | * | 12/1998 | Mukai et al. | 180/446 |
| 6,129,172 A | * | 10/2000 | Yoshida et al. | 701/41 |
| 6,226,580 B1 | * | 5/2001 | Noro et al. | 180/443 |

FOREIGN PATENT DOCUMENTS

| | | |
|---|---|---|
| JP | 2-195221 | 8/1990 |
| JP | 8-91236 | 4/1996 |

OTHER PUBLICATIONS

English Language Abstract of JP 8-91236.
English Language Abstract of JP 2-195221.

* cited by examiner

*Primary Examiner*—Gary Chin
(74) *Attorney, Agent, or Firm*—Greenblum & Bernstein, P.L.C.

(57) ABSTRACT

A torque detection apparatus includes a torque sensor, a sensor circuit, a signal processing circuit, and an abnormal state monitoring circuit. The torque sensor is arranged on a rotary shaft and operates to output a predetermined electric signal related to a torque applied to the rotary shaft. The sensor circuit outputs the predetermined electric signal as a sensor circuit signal. The signal processing circuit processes the sensor circuit signal in order to output a torque detection signal. The abnormal state monitoring circuit is arranged proximate the signal processing circuit and operates according to the sensor circuit signal to detect an abnormal operation.

9 Claims, 9 Drawing Sheets

TORQUE DETECTION APPARATUS

BACKGROUND OF THE INVENTION

1. Field of the Invention

The present invention relates to a torque detection apparatus such as a torque detection apparatus used in a electric power steering (EPS) developed for reducing the vehicle steering effort.

2. Description of the Related Art

Conventionally, a magnetostrictive torque sensor has been used for detecting a steering torque required for operation control of the electric power steering (EPS).

As disclosed in Japanese Patent Publication 8-91236 and Japanese Patent Publication 2-195221 [2], this type of torque sensor is provided with a signal processing circuit for processing a predetermined electric signal from the torque sensor and outputting a torque detection signal.

Document [1] discloses a new technique associated with a steering feeling of an electric power steering (EPS). More specifically, a torque sensor circuit signal and a vehicle speed signal are input to the signal processing circuit and according to the vehicle speed, a phase compensation (delay or advance compensation) is performed by software on the torque sensor circuit signal, so that the steering feeling is improved and the steering hunting is prevented.

In this case, the software phase compensation, specifically, has a configuration so as to execute the software phase compensation by switching between predetermined constants according to the vehicle speed.

Moreover, document [2] sets as an important target to stabilize a signal output from a torque sensor. Especially when the signal processing circuit has failed and the output of the signal processing circuit is abnormally increased or lowered, the output signal of the signal processing circuit is forced to be grounded, so as to forcibly interrupt output of an incorrect torque detection signal. That is, the operation control of the electric power steering (EPS) is substantially interrupted, so that the steering hunting is prevented.

However, the torque sensor disclosed in document [1] has a problem as follows. For example, when a hunting has occurred due to a failure of a component of the magnetostriction torque sensor or a part of the EPS controller, it is impossible to cope with the hunting only by switching torque sensor circuit signal from a predetermined constant to another according to the vehicle speed so as to perform a software phase compensation.

Moreover, in the torque sensor disclosed in Document [2], as has been described above, when an error is detected, the torque detection signal is immediately made zero to interrupt the steering operation control by the EPS. Accordingly, if an external noise is mixed in the torque sensor signal to instantaneously increase or decrease the signal processing circuit output abnormally, there arises a problem that the signal processing circuit output signal is immediately forced to be grounded to be come 0, which interrupts the control operation by the EPS controller.

SUMMARY OF THE INVENTION

It is therefore an object of the present invention to provide a torque detection apparatus that is capable of catching an error signal output from a signal processing circuit with a high accuracy, and properly performing an interrupt control of the control operation by an EPS controller, so that the EPS can have an effective fail-safe characteristic.

The torque detection apparatus has a torque sensor arranged on a rotary shaft that outputs a predetermined electric signal according to a torque applied to the rotary shaft. A sensor circuit outputs the predetermined electric signal output from the torque sensor, as a sensor circuit signal. A signal processing circuit processes an output from the sensor circuit and outputs the processed output as a torque detection signal. An abnormal state monitoring circuit arranged adjacent to the signal processing circuit operates according to the sensor circuit signal so as to monitor a presence/absence of an abnormal operation.

The abnormal state monitoring circuit includes a signal monitoring circuit that monitors a presence/absence of a hunting state in the sensor circuit signal, a control circuit that operates upon detection of the hunting state to forcibly converge an output value of the torque detection signal to a predetermined value, and an error signal output circuit which outputs a predetermined level error signal, such as for example, a High level error signal or a Low level error signal, to the EPS controller.

The aforementioned configuration is arranged, for example, adjacent to an EPS controller of an electric power steering and outputs the torque detection signal to the EPS controller. According to this torque detection signal, the EPS controller urges an auxiliary steering torque to the power steering apparatus.

The torque detection signal is generated in a signal processing circuit by a signal processing of a sensor circuit signal based on the torque sensor output. Moreover, simultaneously with this, the sensor circuit signal is used to monitor the presence/absence of the hunting state in the signal monitoring circuit of the abnormal state monitoring circuit.

The hunting state of the sensor circuit signal is caused by a failure of the torque sensor (or the sensor circuit, or a control error of the EPS controller). By monitoring this hunting state, an error generated in the respective components can be detected.

When the hunting state is generated in the sensor circuit signal, the torque detection signal output form the signal processing circuit is also in a hunting state. The control circuit of the abnormal state monitoring circuit operates to gradually reduce the hunting amplitude of the hunting torque detection signal. Accordingly, a torque control by the EPS is also converged in its urge amount.

After this, an error signal is output by the error signal output circuit to the EPS controller. For example, upon reception of this error signal, the EPS controller stops a torque urge control of the power steering apparatus.

According to a feature of the invention, the signal monitoring circuit includes a hunting state identification function which determines whether a signal associated with the sensor circuit signal is in a hunting state. An output suppressing function operates when the signal associated with the sensor circuit signal is determined to be in the hunting state and controls, via the control circuit, the output level of the signal processing circuit, so that the output level is at a predetermined middle point potential. An error signal output control function operates when a predetermined period of time has elapsed after the output level of the signal processing circuit is controlled to be at the middle point potential, and forces the error signal output circuits to output a High level or a Low level error signal.

According to another feature of the invention, when the hunting state is generated, the output level of the torque detection signal is adjusted to be the middle point potential. Accordingly, in the EPS controller, the drive torque urging the power steering apparatus is gradually converged to 0.

After this, an error detection signal is output, and upon reception of this signal, the EPS controller terminates the torque urge control of the power steering apparatus.

According to an advantage of the invention, the signal monitoring circuit is supplied with the sensor circuit signal output from the sensor circuit, via a hunting information detection circuit that includes a high pass filter.

According to another advantage of the invention, the high pass filter operates in such a manner that only the sensor circuit signals having a frequency band higher than a predetermined value are output to the signal monitoring circuit. The signal monitoring circuit monitors the presence/absence of the hunting state associated with the sensor circuit signals of only this frequency band.

Here, the pass frequency of the high pass filter is preferably set to a frequency band where the hunting is easily caused.

The hunting state identification function of the signal monitoring circuit operates and decides that the output of the sensor circuit is in a hunting state when a fluctuation frequency associated with the sensor circuit signal output from the sensor circuit is gradually lowered and the amplitude of the output signal is gradually increased with a fluctuation exceeding a predetermined potential.

In addition, the signal monitoring circuit converges the output of the sensor circuit signal to the middle point potential and outputs an error signal only when the aforementioned three phenomena are detected, i.e., the lowering of the fluctuation frequency, the increasing of the amplitude, and a fluctuation exceeding a predetermined potential.

The signal monitoring circuit includes an amplitude fluctuation measurement function that determines whether the amplitude of the sensor circuit signal exceeds a reference value for a period of time exceeding a predetermined value, and operates to execute the hunting state identification function of the signal monitoring circuit when the amplitude fluctuation measurement function has determined that the amplitude of the torque detection signal has exceeded a predetermined reference value for a predetermined period of time.

In this invention, the amplitude fluctuation measurement function is used to determine whether the amplitude of the sensor circuit signal is greater than the reference value. If the determination is positive (yes), the state continuation time is counted. When this continuation time exceeds a predetermined period of time, it is determined whether a hunting state is present.

DESCRIPTION OF THE PREFERRED EMBODIMENTS

Figure 1:
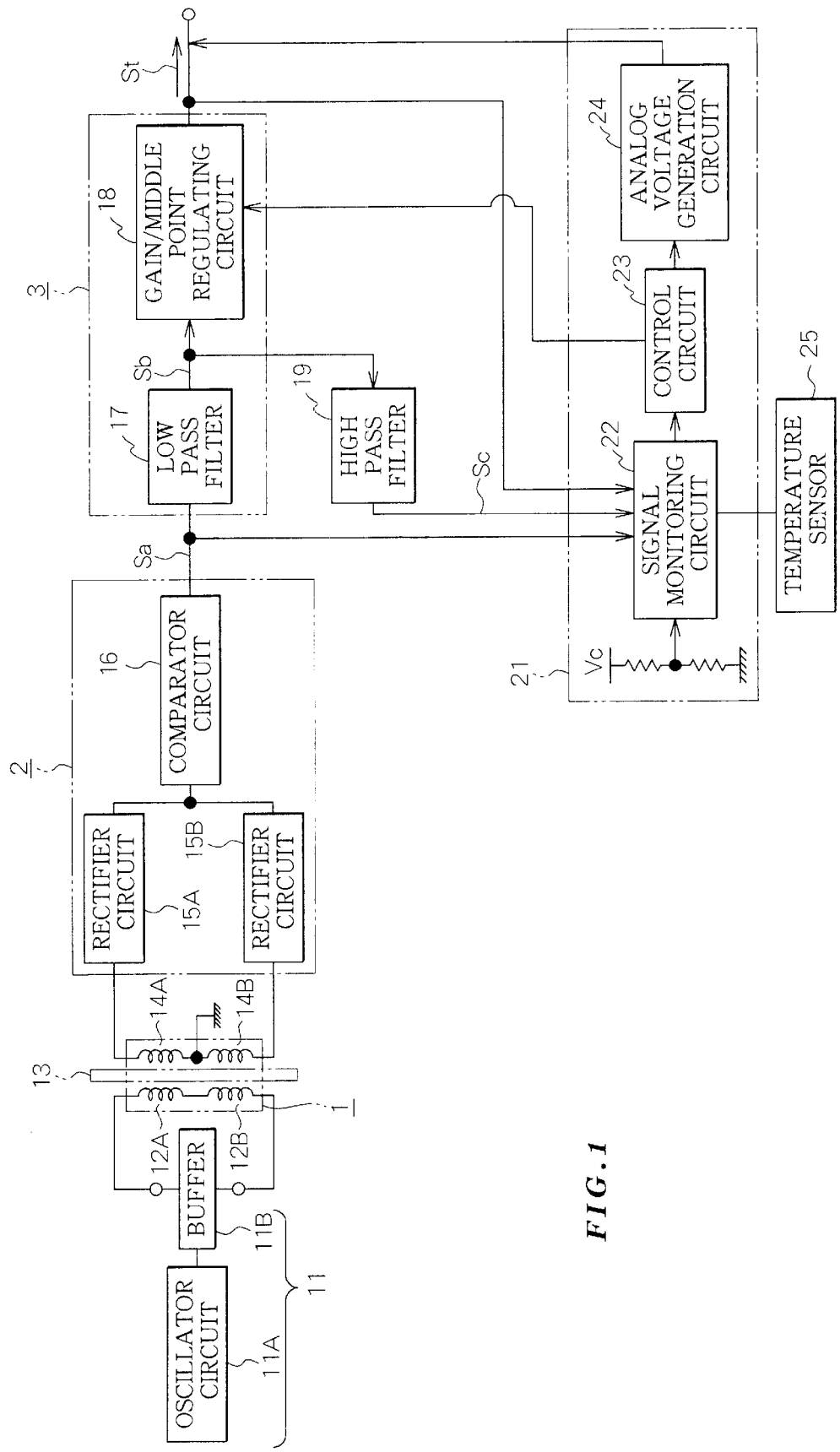
FIG. 1 is a functional block diagram showing an essential portion of a torque detecting apparatus according to an embodiment of the present invention.

Description will now be directed to preferred embodiments of the present invention with reference to the attached drawings. FIG. 1 is a functional block diagram showing an essential portion of a torque detecting apparatus according to an embodiment of the present invention.

The torque detection apparatus shown in FIG. 1 includes a torque sensor 1, a sensor circuit 2 which is supplied with a predetermined electric signal from the torque sensor 1 and outputs the electric signal as a sensor circuit signal Sa, and a signal processing circuit 3 for processing an output Sb from the sensor circuit 2 so as to output the signal as a torque detection signal St.

The torque sensor 1 is a magneto-striction type which is arranged on a rotary shaft (not depicted) of a steering shaft of a vehicle and has a function to output a predetermined electric signal corresponding to the torque applied to the rotary shaft.

More specifically, the torque sensor 1 includes an excitation source 11, excitation coils 12A and 12B excited by this excitation source 11, a sensor shaft 13 around which the coils 12A and 12B are wound, and detection coils 14A and 14B wound around the sensor shaft 13 coaxially with the excitation coils 12A and 12B.

Here, the excitation source 11 consists of an oscillator circuit 11A and a buffer (current amplifier circuit) 11B for amplifying the output signal from the oscillator circuit 11. Moreover, in the sensor shaft 13, a groove is formed at the direction of +45 degrees and −45 degrees (based on the center line of the sensor shaft). The aforementioned excitation coils 12A and 12B are arranged corresponding to these grooves. Moreover, this sensor shaft 13 is connected to a rotary shaft such as the steering shaft of the vehicle so as to form a unitary block.

The sensor circuit 2 includes rectifier circuits 15A and 15B for rectifying detection signals output from the first and the second detection coils 14A and 15B, respectively, and a comparator circuit 16 for comparing the outputs from the rectifier circuits 15A and 15B to each other and outputting a difference as the aforementioned sensor circuit signal Sa.

Furthermore, the signal processing circuit 3 includes a low pass filter 17 having a function of smoothing (setting a frequency characteristic) the sensor circuit signal Sa from the sensor circuit 2 and the gain/middle point regulating circuit 18 for correcting the output Sb from the low pass filter 17.

The EPS controller (not depicted) is fed with the output of this gain-middle point regulating circuit 18 as an output signal (i.e., torque detection signal St) from the signal processing circuit 3, so that the EPS controller controls operation of the electric power steering (EPS).

Adjacent to the aforementioned signal processing circuit 3, there is provided an abnormal state monitoring circuit 21 which operates according to the sensor circuit signal Sa and monitors presence/absence of an error in the signal processing circuit 3 or in the EPS controller.

The abnormal state monitoring circuit 21 includes: a signal monitoring circuit 22 for monitoring presence/absence of the hunting of the sensor circuit signal Sa according to a predetermined reference; a control circuit operating, upon detection of an abnormal hunting from the sensor circuit signal Sa by the signal monitoring circuit 22, so as to forcibly converge the torque detection signal to a predetermined value; and an analog voltage generator circuit 24 as an error signal output circuit which is urged to operate by the control circuit 23 and outputs a high level or low level error generation signal to the EPS controller.

Figure 10:
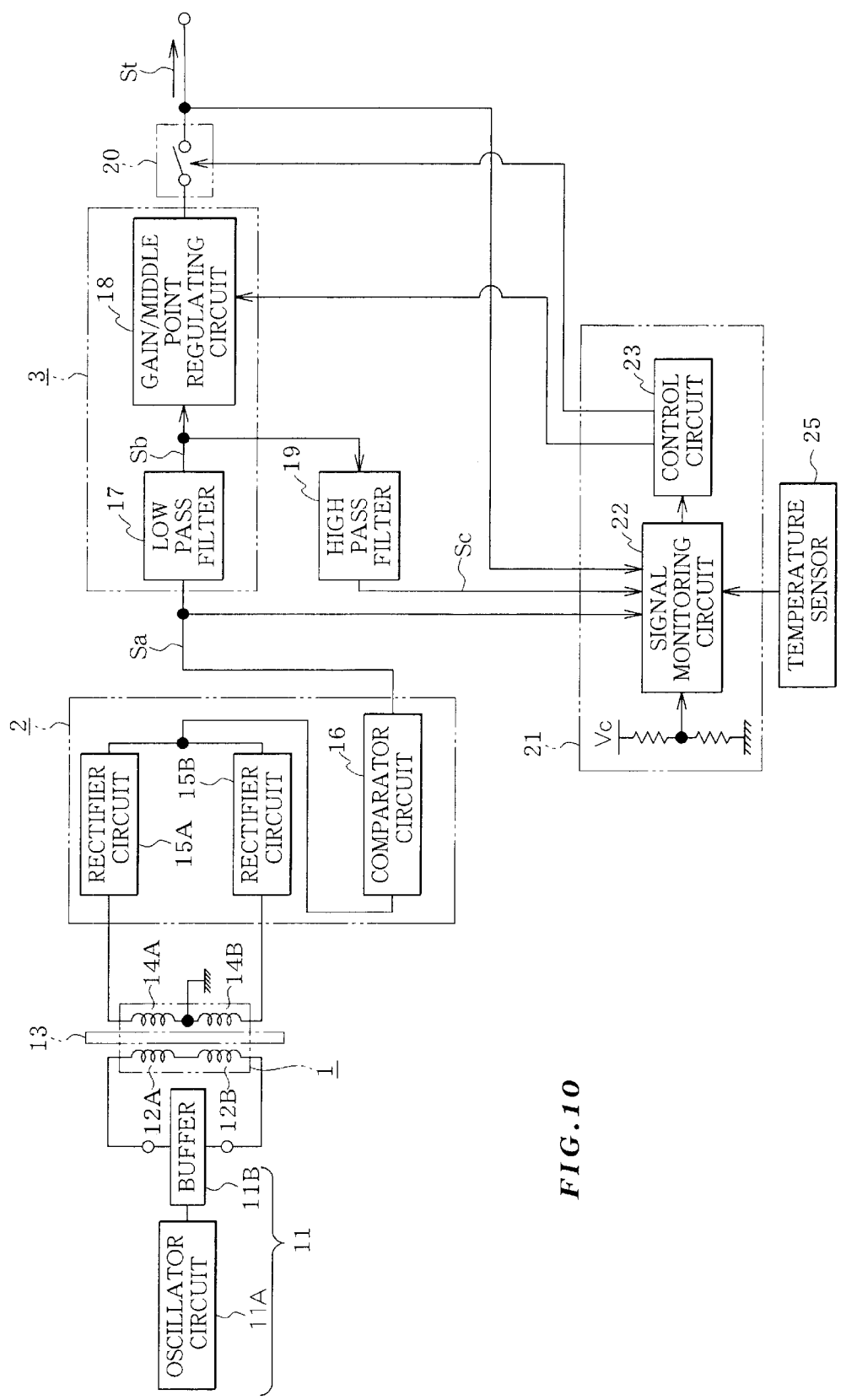
FIG. 10 is a functional block diagram showing an essential portion of a torque detection apparatus according to a second embodiment.

Moreover, as shown in FIG. 10, the analog voltage generator circuit 24 can be omitted by providing a switch 20 which is turned from ON to OFF by an instruction from the control circuit 23 between the gain-middle point regulating circuit 18 and the EPS controller and by setting the EPS controller so as to detect a low level signal as a fail signal.

When this configuration is used, the control circuit 23 is constructed so as to output an OFF instruction to the switch 20 instead of driving the analog voltage generator circuit 24.

The essential portion of the signal monitoring circuit 22 and the control circuit 23 is constituted by a microprocessor (hereinafter, referred to as CPU).

Here, the abnormal state monitoring circuit 21 normally controls the gain/middle point regulating circuit 18 according to a temperature detection signal from a temperature sensor 25 for detecting a temperature around the torque sensor 1 and is constructed so that an appropriate torque detection signal St corresponding to the sensor circuit signal Sa is externally output to the EPS controller regardless of the ambient temperature. Moreover, upon failure, a fail output is performed as will be detailed later.

In this embodiment, the low pass filter 17 allows passing of a signal having a frequency of 100 Hz or below while the high pass filter 19 allows passing of a signal having a frequency of 20 Hz or above. The combination of these two filters extracts from the sensor circuit signal Sa only a measurement signal Sc in the range from 20 to 100 Hz which easily causes hunting and feeds the measurement signal Sc to the signal monitoring circuit. This measurement signal Sc is a part of the sensor circuit signal Sa.

The hunting in the sensor circuit signal Sa may be caused by a failure of the torque sensor 1 or the sensor circuit 2 constituting the detection means as well as a control failure of the EPS controller such as a hunting of the drive torque generated by a failure of an instruction for an electric motor for the power assist.

That is, since the steering wheel is grasped by the driver, when the electric motor for the power assist flutters, distortions in the positive and negative directions are alternately generated on the steering shaft located between the steering wheel fixed by the hands of the driver and the electric motor. This is detected by the torque sensor 1 and hunting occurs in the output signal from the torque sensor 1.

Accordingly, by detecting an error of the torque detection signal St, it is possible to detect an error of the torque sensor 1 and the sensor circuit 2 themselves as well as an error of the EPS controller.

The signal monitoring circuit 22 has a hunting identification function for determining whether the sensor circuit signal Sa is in a hunting state according to the measurement signal Sc representative of the state of the sensor circuit signal Sa output from the sensor circuit 2, and an output suppressing function operated upon detection of a hunting state of the sensor circuit signal Sa, so as to adjust via the control circuit 23 the output level of the signal processing circuit 3 to be a predetermined middle point potential (such as 2.5 [V]).

When this signal monitoring circuit determines that the measurement signal Sc, i.e., the sensor circuit signal Sa is in the hunting state, firstly, the output level of the signal processing circuit 3 is limited to the vicinity of the middle point potential. With this, it is possible to suppress the unpleasant operation (of the steering wheel) feeling while the hunting continues.

Moreover, the signal monitoring circuit 22 has an error signal output control function that is operated when a predetermined period of time has elapsed after adjusting the output level of the signal processing circuit 3 to the middle point potential, and urges the aforementioned error signal output circuit 24 to output an error generation signal of high or low level.

Furthermore, this signal monitoring circuit 22 is configured so as to detect the sensor circuit signal Sa, the torque detection signal St, i.e., the final output from the gain/middle point regulating circuit 18, and the power source voltage Vc. The signal monitoring circuit 22 monitors these values and compare them to allowable values so as to detect an error other than the hunting such as an electric failure in the sensor circuit and the signal processing circuit 3 as well as in the power source voltage.

Furthermore, the hunting state identification function of the signal monitoring circuit 22 is actuated to determine whether the output of the sensor circuit is in a hunting state when (1) the varying frequency applied to the sensor circuit signal Sa from the sensor circuit 2 is gradually lowered, (2) the amplitude of the output signal Sa is gradually increased, and (3) a predetermined potential (for example, 2.5 [V]: middle point potential) is exceeded.

Here, the signal monitoring circuit 22 may be constructed so as to include an amplitude fluctuation measurement function to determine whether the amplitude of the sensor circuit signal Sa has exceeded a predetermined reference value (for example, 2.5 [v]: middle point potential) continuously for a predetermined period of time. In this case, according to the present embodiment, the operation timing of the hunting state identification function is set so that it is actuated when the amplitude fluctuation measurement function determines that the amplitude of the sensor circuit signal Sa has exceeded a predetermined reference value continuously for a predetermined period of time.

With this configuration, even if an external noise temporarily causes a hunting state or a phenomenon equivalent to the hunting within a period of time not affecting the steering feeling, the aforementioned torque detection signal St can be output as it is, assuring the stable operation of the entire apparatus.

Moreover, the aforementioned signal monitoring circuit 22 has an operation voltage monitoring function that determines whether operation signals of the other circuits have an error according to the voltage level and, if necessary, outputs the determination result.

Next, the operation of the embodiment (control operation by the abnormal state monitoring circuit 21) will be explained more specifically.

FIG. 3 to FIG. 6 are a continuous flowchart showing an outline of an error detection processing which is repeatedly executed at a predetermined processing cycle on a millisecond basis by the CPU constituting the essential portion of the signal monitoring circuit 22 and the control circuit 23.

The CPU which has started an error detection process, firstly, checks whether a value 1 indicating a gain attenuation process execution is set in the gain adjustment process execution flag F3 (step S1) and then checks whether a value 2 indicating a middle point potential maintaining process is set in the gain adjustment process execution flag F3 (step S2). Since an initial value 0 is set by an initialization process when power is turned on is set in the gain adjustment process execution flag F3, at this stage, the checks in step 1 and step 2 result in false.

It should be noted that the gain attenuation process execution means a process for converging the torque detection signal St of the signal processing circuit 3 to the middle point potential, i.e., operation of the output suppressing function. Moreover, the middle point potential maintaining process means a wait state after the output level converged until a high level or low level error generation signal is output, i.e., a wait state for the operation of the error signal output control function.

Next, the CPU substitutes a value of a current output register Rn into a preceding output register Rp (step S3). At this stage, the voltage value of the measurement signal Sc detected via the high pass filter 19 at the preceding processing cycle is maintained as it is in the register Rn. Accordingly, in the process of step S3, the voltage value of the measurement signal Sc detected at the preceding processing cycle, i.e., a value of the measurement signal Sc in the preceding cycle is stored in the preceding output register Rp. However, at initialization when power is turned on, the value of the middle point P is set as a initial value in the current output register Rn and accordingly, at the first processing cycle immediately after power is turned on, the value of the middle point is stored in the preceding output register Rp.

Next, the CPU reads in a current value of the measurement signal Sc via the high pass filter 19 (step S4) and stores the voltage value as a current value of the measurement signal Sc detected at the current processing cycle, into the current output register Rn (step S5).

Next, the CPU determines whether 0 is set in an increase/decrease state flag F1 (step S6). The increase/decrease state flag F1 may be 0 indicating that a value of the measurement signal Sc has been decreasing at the preceding cycle or 1 indicating that the value of the measurement signal Sc has been increasing at the preceding cycle. Immediately after power is turned on, 0 is set in the increase/decrease state flag F1 because of the initialization and accordingly, the decision result of step S6 is inevitably true.

Consequently, at this stage, the value of the increase/decrease state flag F1 may not indicate the increase/decrease state of the measurement signal Sc correctly. However, after several processing cycles are repeated, the value of the increase/decrease state flag F1 correctly indicates the increase/decrease state of the measurement signal Sc. Here, explanation will be continued, assuming that the value of the increase/decrease state flag F1 is correct.

Here, if the decision result of step S6 is true, it means that the value of the measurement signal Sc has been decreasing at the preceding cycle. Consequently, the CPU subtracts the value of the preceding output register Rp from the value of the current output register Rn and determines whether a resultant value is smaller than 0, i.e., determines whether the value of the measurement signal Sc has been continuing to decrease (step S7).

If the decision result of step S7 is false, i.e., if the value of the measurement signal Sc has changed from the decrease tendency to the increase tendency, then a smaller value of the two, i.e., the value of the preceding output register Rp is stored as a value corresponding to the trough of the amplitude into a minimum value register Rmin (step S8) and 1 is set in the increase/decrease state flag F1 indicating that the value of the measurement signal Sc is increasing (step S9).

Next, the CPU substitutes a value of a current cycle register Rf into a preceding cycle register Rfp (step S10). At this stage, the current cycle register Rf retains the waveform cycle of the measurement signal Sc obtained at the moment when the amplitude trough has been detected immediately before. Accordingly, in the process of step S10, the preceding cycle register Rfp is fed with the cycle of the waveform of the measurement signal Sc obtained at the moment when the amplitude trough has been detected immediately before. However, in the initialization when power is turned on, 0 is set as an initial value in the current cycle register Rf. Accordingly, at a first trough detected immediately after power is turned on, 0 is stored in the preceding cycle register Rfp.

Next, the CPU reads in a current value of time elapse counted by a frequency timer T1 which has been restarted at the moment of detection of the amplitude trough immediately before, i.e., a value indicating a cycle from a trough to a next trough of the waveform of the measurement signal Sc and stores the value as the latest information of the waveform of the measurement signal Sc in the current cycle register Rf (step S11). Simultaneously with this, the cycle timer T1 is restarted so as to start measurement of a cycle of a subsequent waveform (step S12).

Next, the CPU substitutes the value of the current amplitude register Rw in the preceding amplitude register Rwp (step S13). At this stage, the current amplitude register Rw retains the value of the amplitude of the waveform of the measurement signal Sc obtained upon detection of an amplitude trough immediately before and accordingly, in the process of step S13, the preceding amplitude register Rwp stores the value of the amplitude of the waveform of the measurement signal Sc obtained upon detection of the amplitude trough immediately before. However, in the initialization process when power is turned on, 0 is set in the current amplitude register Rw and accordingly, 0 is stored in the preceding amplitude register Rwp in the process when a first trough is detected immediately after power is turned on.

Next, the CPU subtracts a value of the minimal value register Rmin from a value of the maximal register Rmax so as to obtain an amplitude of the waveform of the measurement signal Sc and stores the obtained value in the current amplitude register Rw to update its content (step S14).

On the other hand, if the decision results of steps S6 and S7 are both true, this means that the value of the measurement signal Sc continues to be reduced and a minimal value cannot be detected. Moreover, this is not appropriate for the timing of measurement start (end) of a cycle of the waveform of the measurement signal Sc or the timing of a process to obtain an amplitude of the waveform of the measurement signal Sc. Accordingly, the steps S8 to S14 are not executed.

On the contrary, if the decision result of step S6 is false, i.e., the value of the measurement signal is increasing, the CPU subtracts the value of the preceding output register Rp from the current output register Rn and decides whether the resultant value of greater than 0, i.e., the value of the measurement signal Sc is increasing between the preceding cycle and the current cycle (step S15).

If the decision result of step S15 is false, then the value of the measurement signal Sc has changed from increase to decrease. Accordingly, the value of the preceding output register Rp is stored as a value corresponding to the amplitude crest in the maximal value register Rmax (step S16), and 0 is set in the increase/decrease state flag F1, indicating that the value of the measurement signal Sc has changed to a decrease state (step S17). In the case of the present embodiment, the process for measurement the cycle and calculation of the amplitude of the waveform of the measurement signal Sc are performed upon detection of a waveform trough. Accordingly, if the decision result of step S6 is false, then the processes of steps S10 to S14 are not required.

On the other hand, if the decision result of step S15 is true, the value of the measurement signal Sc continues to be increasing and a maximal value cannot be detected. Accordingly, the processes of steps S16 and S17 are not executed.

Next, the CPU as a signal monitoring circuit decides whether the amplitude of the waveform of the measurement signal Sc stored in the current amplitude register Rw is greater than the admissible value (set value), i.e., whether an error is contained in the waveform detected during the current vibration cycle (step S18). Note that this is not a final decision.

If the decision result of step S18 is false, i.e., if the amplitude of the waveform of the measurement signal Sc is within the admissible value, the CPU decides that no error is contained and checks whether 0 is set in the measurement execution flag F2 (step S19). The measurement execution flag F2 may be 0 indicating that an error continuation time counting timer T2 is in a non-activated state or 1 indicating that the error continuation time counting timer T2 is operating.

When 1 is set in the measurement execution flag F2, i.e., when the decision result of step S19 is false, this means that the decision result of step S18 has been true in a preceding cycle, indicating that an error is contained, and the counting by the error continuation time counting timer T2 has been started. However, in this case, the decision result of step S18 has become false and the amplitude error problem has been solved within the admissible time of the error continuation time counting timer 2. Accordingly, the CPU resets the error continuation time counting timer T2 to stop its operation (step S20) and sets 0 in the measurement execution flag F2 indicating that the error continuation time counting timer T2 is in a non-activated state (step S21), terminating the error detection process of this cycle.

Moreover, if the decision result of step S19 is true, i.e., 1 has not been set in the measurement execution flag F2 from the beginning, processes of steps S20 and S21 are not required.

In these cases, in the following cycles, the processes of steps S1 to S19 are selectively executed repeatedly.

On the other hand, if the decision result of step S18 is true, the CPU as the signal monitoring circuit decides that an error is contained in the waveform detected during the current cycle and checks whether 0 is set in the measurement execution flag F2 (step S22).

Further, if the decision result of step S22 is true, i.e., 0 has been set in the measurement execution flag F2 and the error continuation time counting timer T2 is in the non-activated state, the CPU as means for achieving the amplitude fluctuation measurement function starts the time counting by the error continuation time counting timer T2 upon detection of the amplitude error as a first stimulus (step S23) and sets 1 in the measurement execution flag F2 indicating that the error continuation time counting timer T2 has entered the operation state (step S24), terminating the error detection process of this cycle.

In this case, in the following cycles, the processes of steps S1 to S18 are selectively executed repeatedly and according to the decision result of step S18, steps S19 to S21 (if an amplitude error has been solved) or steps S22 to S25 (if an amplitude error has not been solved) are executed.

Moreover, if the decision result of step S22 is false, this means that the decision result of step 18 has been true in the preceding process cycle, i.e., it has been decided that an error is contained and the time counting has been started by the error continuation time counting timer T2 and that the voltage waveform has an amplitude error at this stage. Accordingly, the CPU continues the error continuation time counting by the timer T2, reads in a current value of the time count by the timer T2, and checks whether the value, i.e., amplitude error continuation time is over than the allowed range (steps S25).

If the decision result of step S25 is false, i.e., if the amplitude error continuation time is within the allowed range, the CPU terminates the error detection process of this cycle.

In this case, in the following process cycles, the processes of steps S1 to S18 and the processes of steps S22 and S25 (if the amplitude error has not been eliminated) are repeatedly executed. It should be noted that as has been described above, even if an amplitude error is detected and the timer T2 is activated, the flag F2 and the timer T2 may be reset when this problem is dissolved.

While repeating these processes, if the decision result of step S25 becomes true, i.e., if the time count by the timer T2 exceeds the allowed value, the CPU as means for achieving the amplitude fluctuation measurement function assumes that there is a high possibility of an error in the waveform of the measurement signal Sc, i.e., the output of the sensor circuit signal Sa, and resets the error continuation time counting timer T2 to stop its operation (step S26). Furthermore, the CPU starts a substantial process to determine whether an error is contained (step S27) to serve as means for realizing the hunting state identification function.

Figure 7:
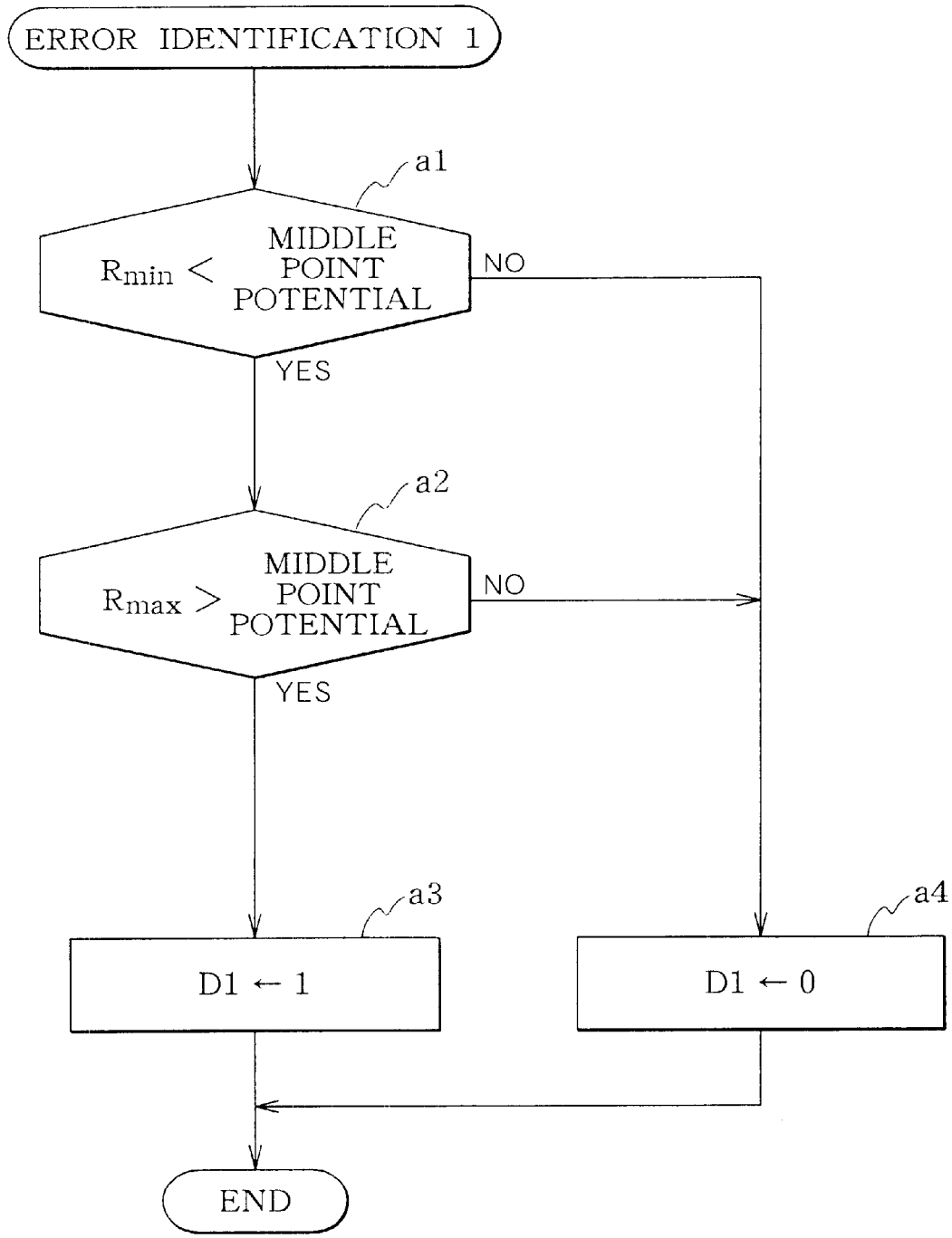
FIG. 7 is a flowchart showing an example of an error identification.
Figure 8:
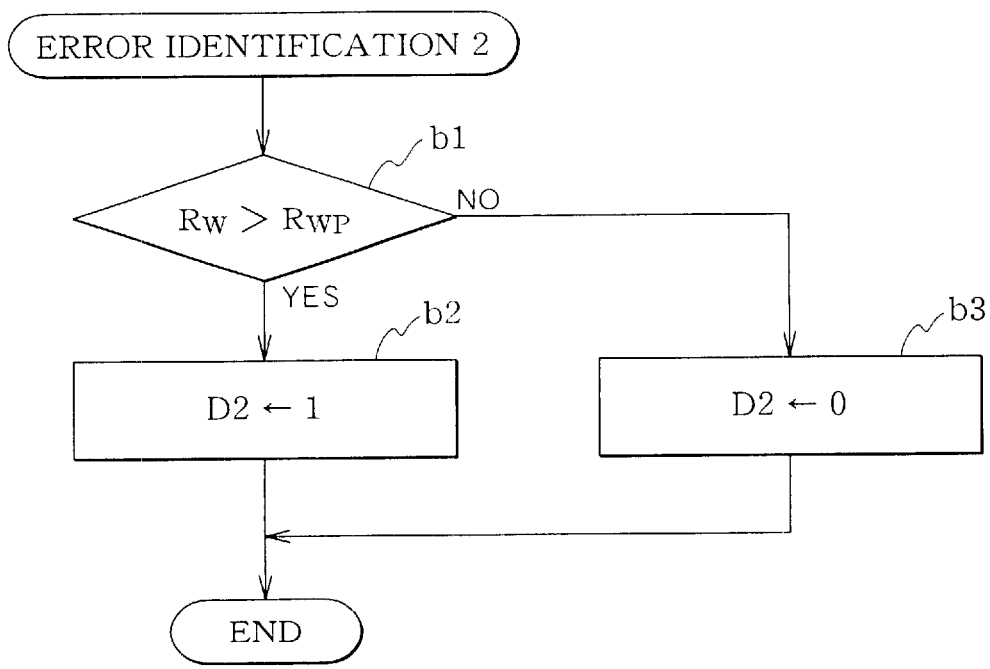
FIG. 8 is a flowchart showing another example of the error identification.
Figure 9:
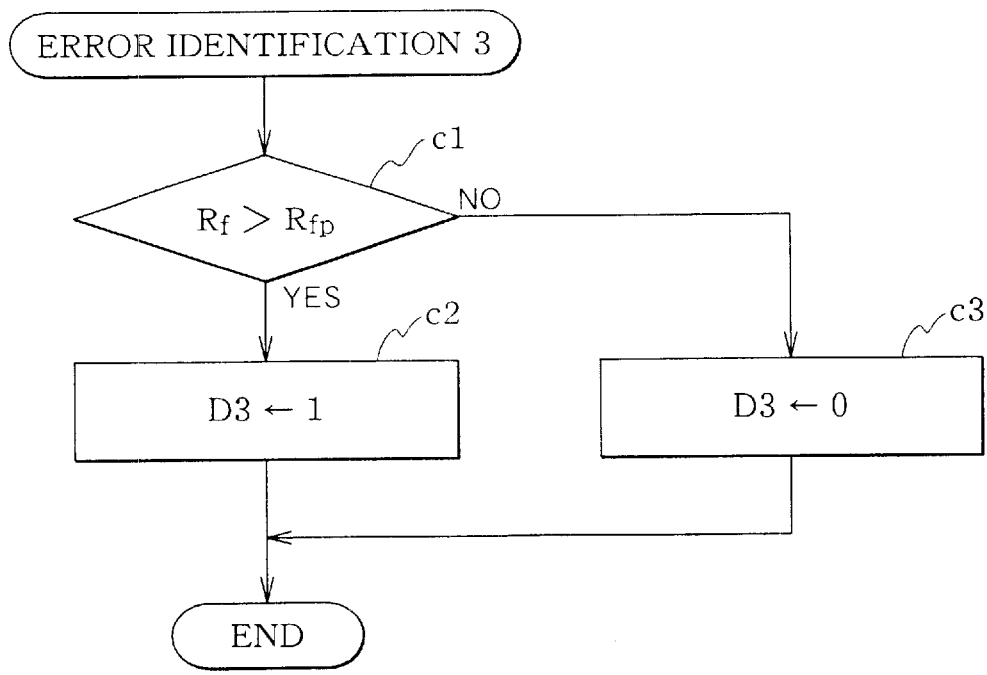
FIG. 9 is a flowchart showing still another example of the error identification.

Some examples of substantial processes for identifying an error are shown in FIG. 7 to FIG. 9.

The decision process 1 shown in FIG. 7 decides whether a waveform fluctuates exceeding a predetermined potential, for example, a middle point potential so as to determine whether a substantial error is present. That is, only when a value of the minimal value register Rmin storing an amplitude trough, i.e., a minimal value is smaller than a value of the middle point potential P (step a1) and a value of a maximal value register Rmax storing an amplitude crest, i.e., a maximal value is greater than the value of the middle point potential P (step a2), an error is decided to be present and 1 is set in an error detection flag D1 (step a3). Otherwise, it is decided that no error is present and 0 is set in the error detection flag D1 (step a4). Thus, a decision is made according to a particular condition.

According to this condition, an error is detected, for example, in the fluctuation of the measurement signal Sc in the hunting state as shown in FIG. 2($a$) and FIG. 2($b$).

Moreover, the decision process 2 shown in FIG. 8 checks whether a substantial error is present depending on whether the amplitude is gradually increase. Only when the value of the current amplitude register Rw exceeds the value of the preceding amplitude register Rwp storing a preceding waveform amplitude (step b1), an error is detected and 1 is set in the error detection flag D2 (step b2). Otherwise, no error is detected and 0 is set in the error detection flag D2 (step b3). Thus, a decision is made according to a particular condition.

According to this condition, an error is detected, for example, in the fluctuation of the measurement signal Sc in the hunting state as shown in FIG. 2($a$) and FIG. 2($b$).

Furthermore, the decision process 3 shown in FIG. 9 decides that a substantial error is preset depending on whether the amplitude cycle is gradually increasing, i.e., whether the fluctuation frequency is gradually lowered. Only when a value of the current cycle register Rf storing a current waveform vibration cycle exceeds a value of a preceding cycle register Rfp (step c1), an error is detected and 1 is set in the error detection flag D3 (step c2). Otherwise, no error is detected and 0 is set in the error detection flag D3 (step c3). Thus, a decision is made according to a particular condition.

Figure 2A:
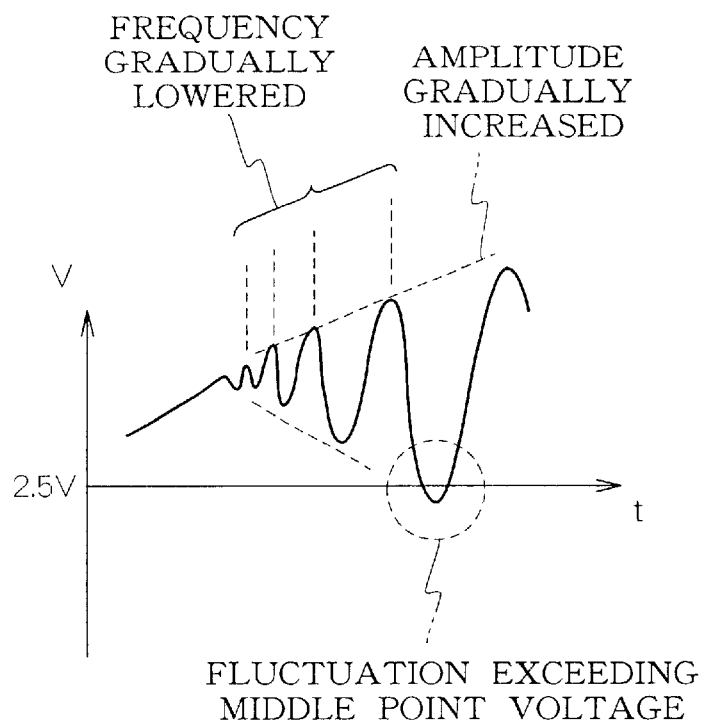
FIG. 2(a) and FIG. 2(b) are conceptual views of errors detected via a high-pass filter.
Figure 2B:
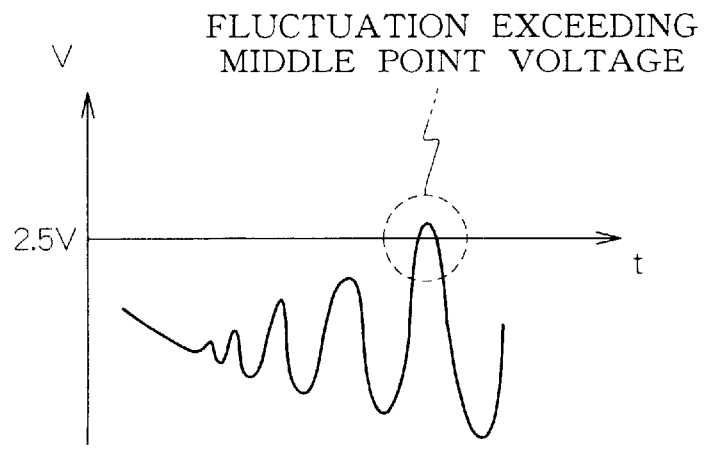
Figure 3:
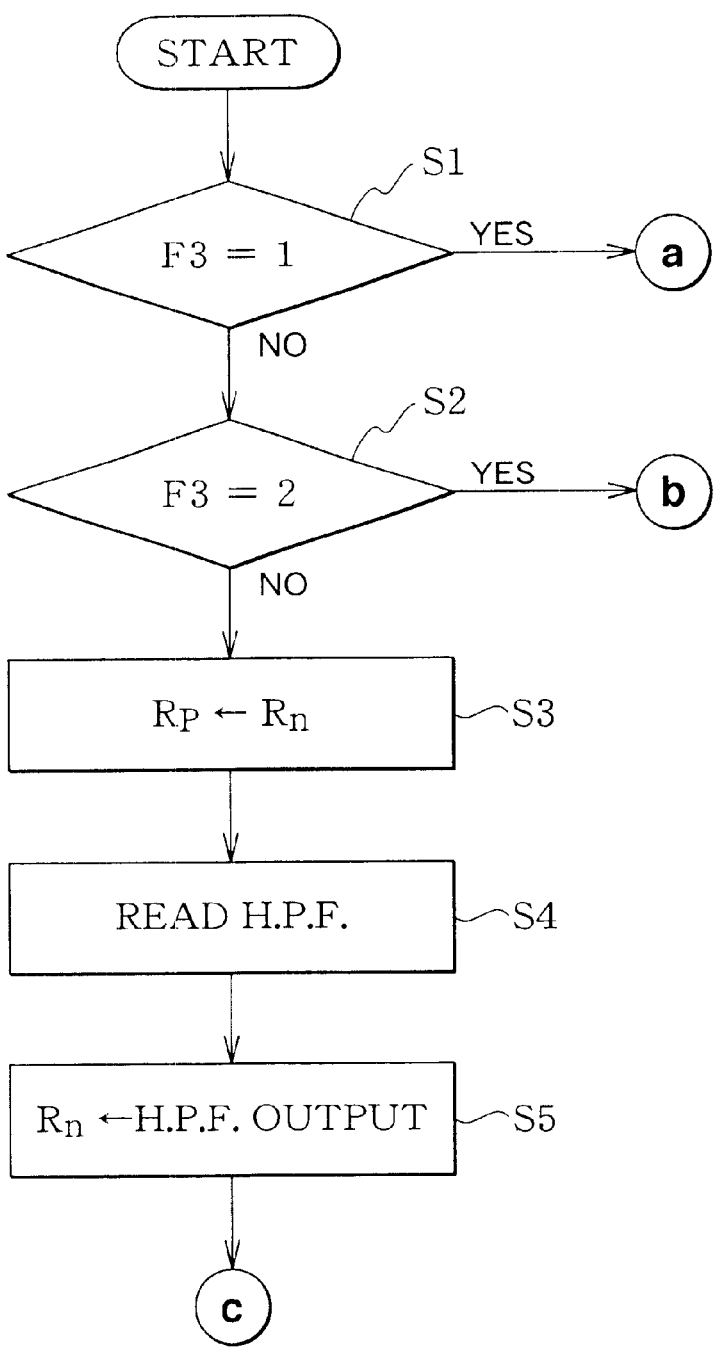
FIG. 3 is a flowchart showing an outline of an error detection process executed by a CPU of an abnormal state monitoring circuit.
Figure 4:
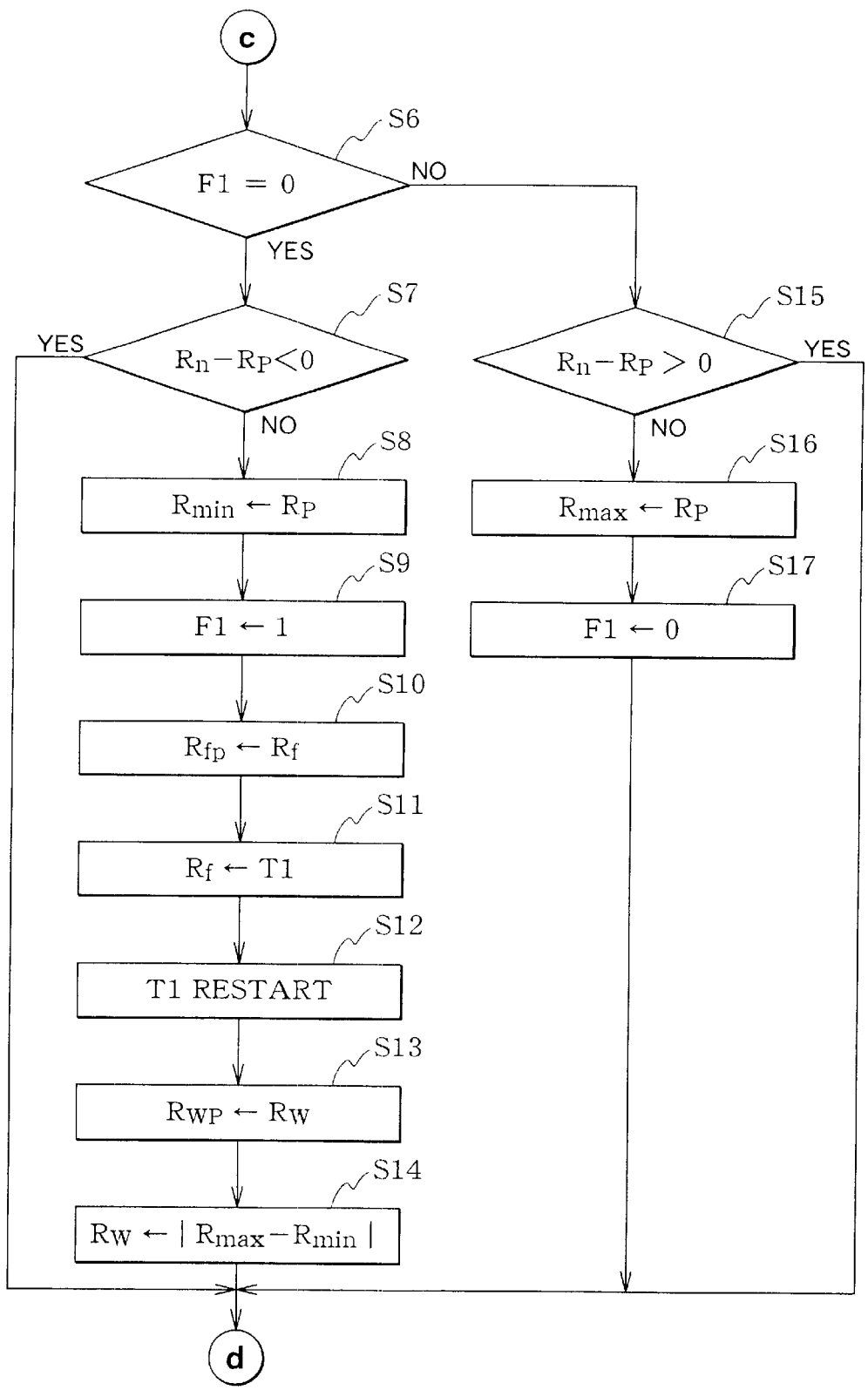
FIG. 4 is a continuation of the flowchart of FIG. 3 showing the outline of the error detection process.
Figure 5:
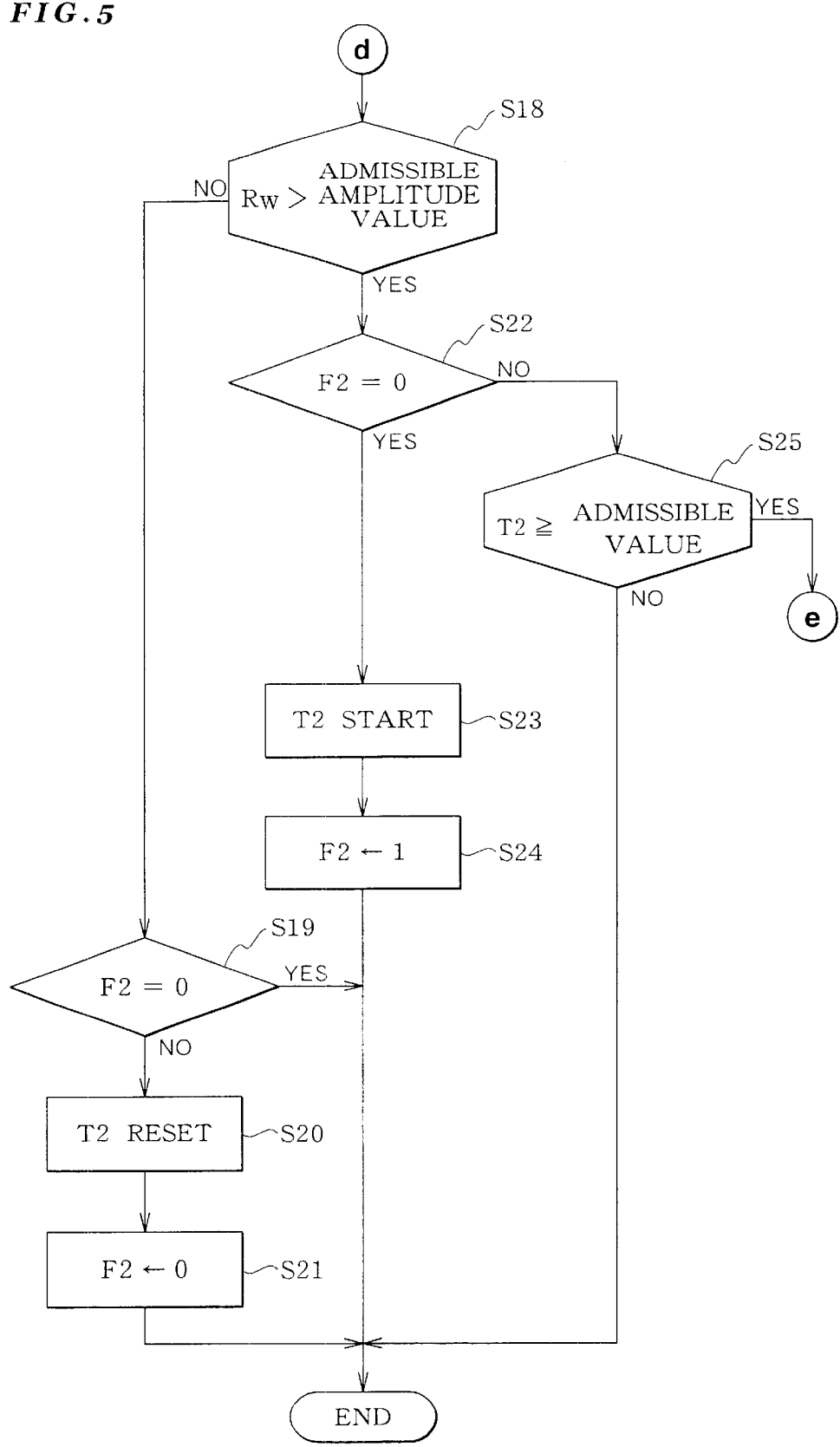
FIG. 5 is a continuation of the flowchart showing the outline of the error detection process.
Figure 6:
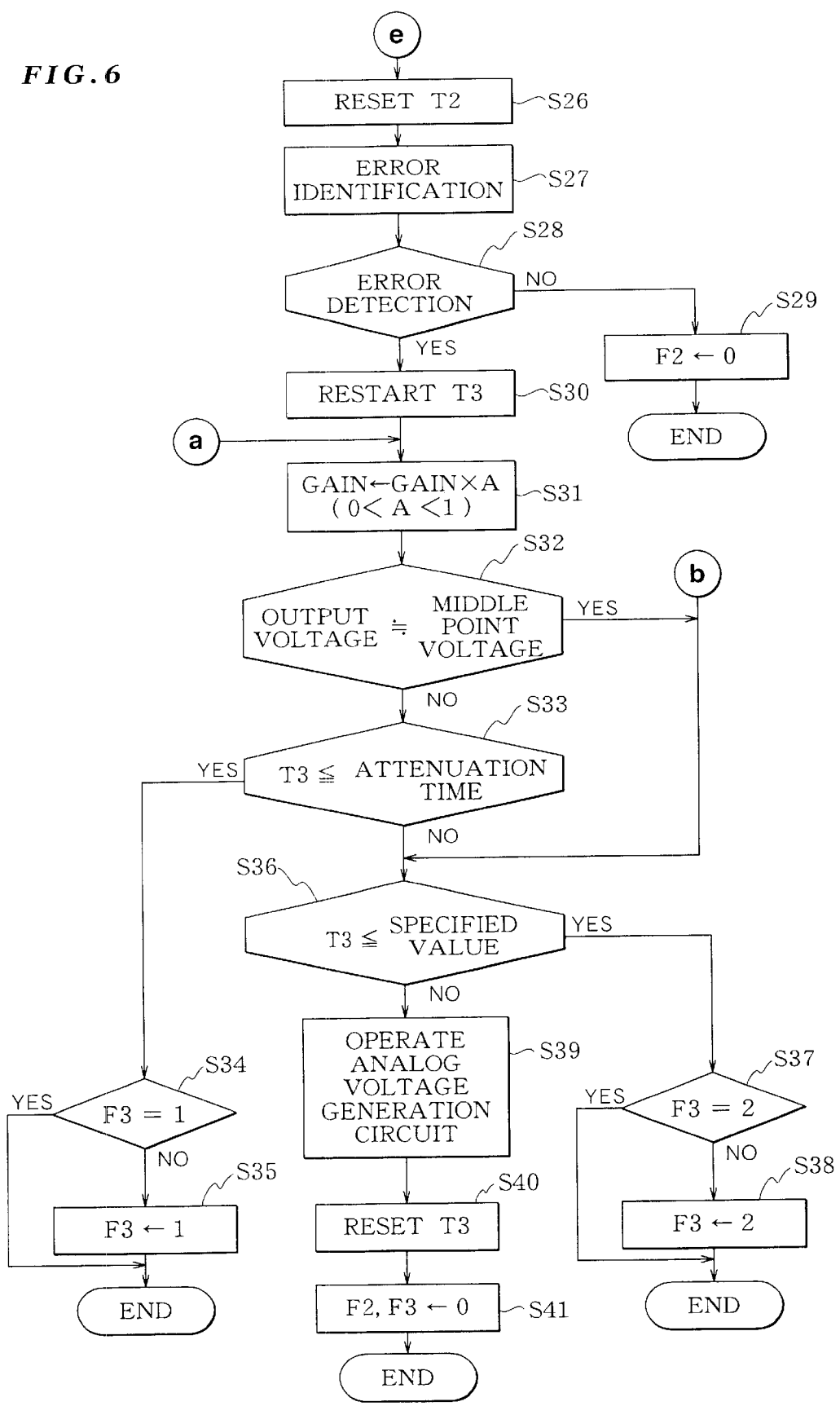
FIG. 6 is a continuation of the flowchart showing the outline of the error detection process.

According to this condition, for example, an error is detected in the fluctuation of the measurement signal Sc in the hunting state as shown in FIG. 2(a), but an error may not be detected in the fluctuation of the measurement signal Sc in the hunting state as shown in FIG. 2(b).

It is a design problem how these conditions are combined to finally decide that an error is present. For example, when an error is to be detected only if all of these conditions are satisfied, a decision can be made according to a direct product of D1, D2, and D3. More specifically, an error is detected if the direct product is 1 and no error is detected if the direct product is 0.

Moreover, when an error is to be detected if one or more conditions are satisfied, or when an error is to be detected if two or more conditions are satisfied, a decision can be made according to a sum of D1, D2, and D3. More specifically, an error is detected if the sum is 1 or more, or an error is detected if the sum is 2 or more.

Instead of using the aforementioned three conditions, it is also possible to make a final decision by comparing the value of the current cycle register Rf (or the preceding cycle register Rfp) to a set value, by comparing the value of the current amplitude register Rw (or the preceding amplitude register Rwp) to a set value, or by comparing the current cycle register (or the preceding cycle register Rfp) to a set value.

Thus, the CPU makes the final decision (S28). If no error is detected in the final decision, the CPU sets 0 in the measurement execution flag F2 indicating that the error continuation time counting timer T2 is in the non-activated state, thus terminating the error detection process of this cycle.

After this, as has been described above, the processes of steps S1 to S18 are selectively executed repeatedly and according to the decision result of step S18, the process of step S19 (if no amplitude error is detected) or steps S22 to S24 (if an amplitude error is detected) are executed.

Moreover, if the aforementioned step S28 decides that an error is present, the CPU resets and starts an attenuation time counting timer T3 so as to start counting an admissible time for attenuating the amplitude (step S30).

Next, the CPU, as means for the output suppressing function, reads in a current gain value set in the gain/middle point regulating circuit 18 and multiplies the value by a coefficient A greater than 0 and smaller than 1, so as to obtain a new gain and set the obtained value in the gain/middle point regulating circuit 18 (step S31). It is also possible to subtract a small value from the gain current value set in the gain/middle point regulating circuit 18, so as to obtain a new gain and set the new value in the gain/middle point regulating circuit 18.

Moreover, the CPU reads in a current value of the torque detection signal St and checks whether the current value is matched with the middle point potential (step S32). If not matched, the CPU checks whether a counting value of the attenuation time counting timer T3 is within an admissible time (set value) for an attenuation process (step S33). Here, if the counting value of the timer T3 is within the admissible time, the CPU further checks whether 1 is set in the gain adjustment execution flag F3 (step S34). If 1 is not set, the CPU sets 1 in the gain adjustment execution flag F3 (step S35), thus terminating the error detection process of this cycle.

Thus, 1 is set in the gain adjustment execution flag F3 and as a result, in the following process cycle and after, step S1 and steps S31 to S34 are repeatedly executed. As a result, the gain value of the gain/middle point regulating circuit 18 is gradually reduced and the middle point potential value is properly controlled according to the set value while the hunting state of the torque detection signal St is gradually attenuated to converge in the vicinity of the middle point potential. This is the output suppressing function.

This results in that the current value of the torque detection signal St is matched with the middle point potential and the decision result of step S32 becomes true.

It should be noted that when an abnormal drift is present in the middle point potential, the current value of the torque detection signal St will not be matched with the middle point potential set even by repeating the aforementioned processes. In such a case, the gain adjustment process is terminated when the counting value of the attenuation time counting timer T3 has reached the admissible time, i.e., when the decision result of step S33 becomes false.

In this way, the gain value of the gain/middle point regulating circuit 18 is gradually reduced so as to converge the value of the torque detection signal St to the middle point potential, thus preventing deterioration of the operation feeling including a feeling that steering wheel operation has become heavy or a strange feeling of operation due to the hunting.

When the decision result of step S32 has become true or when the decision result of step S33 has become false, the CPU checks whether the count value of the attenuation time counting timer T3 has reached a specified value of wait process for maintaining the middle point potential (step S36). If not reached, the CPU further checks whether 2 is set in the gain adjustment execution flag F3 indicating that the middle point potential maintaining process is executed (step S37). If 2 has not been set, the CPU sets 2 in the gain adjustment execution flag F3 indicating the middle point potential maintaining process (step S38), terminating the error detection process of this cycle.

In this embodiment, the attenuation time counting timer T3 is used for both of the attenuation process time control and the middle point potential maintaining process time control (see steps S30, S33, and S36) and accordingly, the specified value of the wait process is set so as to include the admissible range of the attenuation process. Consequently, the specified value of the wait process is greater than the admissible value of the attenuation process.

Thus, 2 is set in the gain adjustment execution flag F3. As a result, in the following process cycle and after, processes of steps S1 and S2 and steps S35 and S37 are repeatedly executed.

While these processes are repeatedly executed, the count value of the attenuation time counting timer T3 reaches a specified value, which is detected by the determination process of step S36. Then the CPU as means for realizing the error signal output control function, actuates an error signal output control function analog voltage generation circuit 24 and outputs a High level (5V) fail signal to the EPS controller (case of FIG. 1) or outputs an OFF instruction to a normally closed switch 20 and opens a circuit with the EPS controller so as to output a Low level (0V) fail signal to the CPS controller (case of FIG. 10). Thus, the CPU inhibits the power assist control by the EPS controller (step S39), resets the attenuation time counting timer T3 (step S40), and set 0 in the measurement executing flag F2 and the adjustment execution flag F3 (step S41), thus terminating the error detection process.

As a result, the power assist is in a non-activated state and the steering operation becomes slightly heavier. However, the driver can get a stable steering feeling without feeling the kickback, i.e., the phenomenon that the steering operation becomes heavier and lighter repeatedly.

Explanation has been given on the processing upon detection of an abnormal hunting by the signal monitoring circuit 22 according to the measurement signal Sc. A similar processing is performed when the signal monitoring circuit 22 has detected an error in the sensor circuit signal Sa, the torque detection signal St, and the power source voltage Vc.

The signal monitoring circuit 22 monitors the sensor circuit signal Sa, the torque detection signal St, and the power source voltage Vc and compares them with admissible values at a predetermined cycle as a separate task from the aforementioned error detection process. Upon detection of a voltage error, the signal monitoring circuit 22 forcibly activates the aforementioned error detection process starting at step S30, and by utilizing the aforementioned error detection process, causes the CPU to execute the gain attenuation process, the middle point potential retention, and the fail signal output.

In the invention disclosed in claim 1, the signal monitoring circuit of the abnormal state monitoring circuit monitors a hunting phenomenon and the like of the sensor circuit and accordingly, it is possible to detect a failure of the torque sensor and the sensor circuit causing the hunting phenomenon as well as a control failure of the EPS controller which is the destination of the torque detection signal output from the signal processing circuit.

When a hunting phenomenon or the like is detected, the control circuit reduces and converges the hunting amplitude of the torque detection signal and an error signal is transmitted to the EPS controller (destination of the torque detection signal output). Accordingly, the hunting phenomenon of the drive torque applied to the power steering apparatus can be soon converged and upon reception of the error signal, the EPS drive can be terminated.

Accordingly, in the EPS controller connected to the torque detection apparatus according to the present invention, the steering hunting phenomenon is suppressed and it is possible to eliminate a case that the steering torque urge is abruptly interrupted without any preceding symptom like in the conventional case. Thus, without deteriorating the steering operation feeling, it is possible to perform an operation control for maintaining a comparatively pleasant state. That is, the present invention can provide a torque detection apparatus capable of effectively operating the fail safe with respect to the EPS.

In the invention disclosed in claim 2, the torque detection signal output level is converged to the middle point potential. Accordingly, the EPS controller can gradually reduces to 0 the drive torque urging the power steering apparatus and then terminating the torque urge control of the power steering.

Accordingly, in the EPS controller connected to the torque detection apparatus according to the present invention, the steering hunting phenomenon is suppressed, and it is possible to eliminate a case that the steering torque urge is abruptly interrupted as in the conventional case, i.e., the torque urge can be controlled to be gradually reduced before terminating the torque urge. Thus, the present invention can provide a torque detection apparatus capable of maintaining a more pleasant steering operation state without deteriorating the steering operation feeling.

In the invention disclosed in claim 3, it is possible to constrict the frequency band of the sensor circuit signal monitored by the signal monitoring circuit. Accordingly, for example, by constricting the pass frequency of the high pass filter to a band where hunting is easily caused, it is possible to detect a hunting phenomenon with a higher accuracy. Moreover, it is possible to eliminate an erroneous detection of a hunting phenomenon with respect to a fluctuation of the sensor circuit signal caused by a noise.

In the invention disclosed in claim 5, hunting identification condition is defined and only when the condition is satisfied, the processing for hunting is performed. This reduces the possibility of an erroneous identification of a hunting with general fluctuations generated in the sensor circuit signal, enabling to detect a hunting phenomenon with a high accuracy.

In the invention disclosed in claim 6, a hunting state is decided to be present only after a large amplitude of the sensor circuit signal has continued for a predetermined period of time. This reduces the possibility of an erroneous detection of a hunting when a noise having a large amplitude is instantaneously generated. Thus, it is possible to detect a hunting phenomenon with a higher accuracy.

The present invention having a configuration and function as has been described above enables to provide an excellent torque detection apparatus which cannot be obtained by the conventional technique.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-242960 (Filed on Aug. 30, 1999) including specification, claims, drawings and summary are incorporated herein by reference in its entirety.

What is claimed is:

1. A torque detection apparatus, comprising:
    a torque sensor arranged on a rotary shaft that outputs a predetermined electric signal related a torque applied to the rotary shaft;
    a sensor circuit that outputs said predetermined electric signal, output from said torque sensor, as a sensor circuit signal;
    a signal processing circuit that processes said sensor circuit signal to output a torque detection signal; and
    an abnormal state monitoring circuit arranged adjacent to said signal processing circuit and operating according to the sensor circuit signal so as to detect an abnormal operation, said abnormal state monitoring circuit comprising:
        a signal monitoring circuit that detects a hunting state in said sensor circuit signal;

a control circuit that operates to forcibly converge an output value of the torque detection signal to a predetermined value upon detecting said hunting state; and an error signal output circuit which operates, in response to said control circuit, to output an error signal having a predetermined level to an EPS controller.

2. The torque detection apparatus of claim 1, wherein said predetermined level comprises one of a HIGH level and a LOW level.

3. The torque detection apparatus of claim 1, wherein the signal monitoring circuit comprises:

a hunting state identification function responsive to said sensor circuit signal that determines whether said sensor circuit signal is in said hunting state;

an output suppressing function, that operates when said sensor circuit signal is determined to be in said hunting state, to set an output level of said signal processing circuit to a predetermined middle point potential; and an error signal output control function, that operates when a predetermined period of time has elapsed after said output level of the signal processing circuit is set to said predetermined middle point potential, to force said error signal output circuit to output said predetermined level.

4. The torque detection apparatus of claim 1, wherein said signal monitoring circuit is supplied said sensor circuit signal via a hunting information detection circuit.

5. The torque detection apparatus of claim 4, wherein said hunting information detection circuit includes a high pass filter.

6. The torque detection apparatus of claim 3, wherein said signal monitoring circuit is supplied with said sensor circuit signal via a hunting information detection circuit.

7. The torque detection apparatus of claim 6, wherein said hunting information detection circuit includes a high pass filter.

8. The torque detection apparatus of claim 3, wherein said hunting state identification function determines that said sensor circuit signal is in said hunting state when a fluctuation frequency associated with said sensor circuit signal gradually decreases and an amplitude of said sensor circuit signal gradually increases with a fluctuation exceeding a predetermined potential.

9. The torque detection apparatus of claim 8, wherein said signal monitoring circuit includes an amplitude fluctuation measurement function that determines whether said amplitude of the sensor circuit signal exceeds a reference value for a period of time exceeding a predetermined value, said amplitude fluctuation measurement function executing said hunting state identification function when said amplitude fluctuation measurement function determines that said amplitude of said torque detection signal exceeds a predetermined reference value for a certain time period.

* * * * *